United States Patent [19]

Mehta

[11] 4,082,708

[45] Apr. 4, 1978

[54] ADHESIVE SYSTEMS COMPRISING A BISAMINO PIPERAZINE-CONTAINING POLYAMIDE

[75] Inventor: Ramesh Mehta, Roseville, Minn.

[73] Assignee: H. B. Fuller Company, St. Paul, Minn.

[21] Appl. No.: 725,012

[22] Filed: Sep. 20, 1976

[51] Int. Cl.$^2$ ............................................. C08G 59/44
[52] U.S. Cl. ........................... 260/18 N; 260/18 PN; 260/18 EP; 260/2 N; 260/47 EN; 260/78 R; 260/830 P; 260/268 C; 260/404.5
[58] Field of Search .......... 260/18 N, 18 PN, 18 EP, 260/404.5 PA, 47 EN, 2 N, 830 P, 78 R, 268 C

[56] References Cited

U.S. PATENT DOCUMENTS

| 2,847,395 | 8/1958 | Weon | 260/47 EN |
|---|---|---|---|
| 2,965,609 | 12/1960 | Newey | 260/47 EN |
| 3,019,076 | 1/1962 | Pardo, Jr. et al. | 8/128 |
| 3,140,566 | 7/1964 | Wagner | 50/536 |
| 3,167,554 | 1/1965 | Ernst | 260/268 |
| 3,212,946 | 10/1965 | Welier et al. | 156/71 |
| 3,242,141 | 3/1966 | Vertnik | 260/268 |
| 3,257,342 | 6/1966 | Kwong | 260/47 EN |
| 3,377,303 | 4/1968 | Peerman et al. | 260/18 N |
| 3,385,744 | 5/1968 | Van Sciver | 156/310 |
| 3,463,847 | 8/1969 | Ueda et al. | 260/78 R |
| 3,557,056 | 1/1971 | Peerman | 260/47 EN |
| 3,563,927 | 2/1971 | Janssen et al. | 260/18 EP |
| 3,666,695 | 5/1972 | Jachimowicz et al. | 260/18 N |
| 3,738,950 | 6/1973 | Sturwold et al. | 260/18 N |
| 3,793,271 | 2/1974 | Godfrey et al. | 260/18 PN |
| 3,943,095 | 3/1976 | Livingston | 260/78 R |

OTHER PUBLICATIONS

Advance Technical Data (Bis(Aminopropyl)Piperazine) Jefferson Chem. Co., July 1974.

Primary Examiner—Eugene C. Rzucidlo
Attorney, Agent, or Firm—Merchant, Gould, Smith, Edell, Welter & Schmidt

[57] ABSTRACT

The disclosed adhesive system comprises a curable liquid epoxide and a bisamino piperazine-containing thermoplastic polyamide hardener or co-curative. This adhesive system forms high strength metal-to-metal bonds with unusually high T-peel strength, high tensile shear strength, excellent low temperature properties, and good impact resistance while possessing the fast assembly speed characteristics of a hot melt. Both two-part and stable one-part curable systems can be formulated from (a) suitable epoxy resins and (b) the bisamino piperazine-containing thermoplastic polyamide.

The particularly preferred polyamide comprises the amidification product, at temperatures of from 180° C. to 300° C., of:

(a) from about 25–35% by weight of a diamine component comprising:
 (1) from about 45–65 equivalent percent of 1,4-Bis(3-aminopropyl) piperazine;
 (2) from about 15–35 equivalent percent polyoxypropylene diamine containing about 2 to about 35 repeating oxypropylene units;
 (3) from about 15–35 equivalent percent piperazine;
(b) from about 65–75% by weight of a dicarboxylic acid component comprising:
 (1) from about 70–100 equivalent percent polymerized tall oil fatty acid having a dimeric fatty acid content greater than 90% by weight;
 (2) from about 0–30 equivalent percent azelaic acid.

18 Claims, No Drawings

ADHESIVE SYSTEMS COMPRISING A BISAMINO PIPERAZINE-CONTAINING POLYAMIDE

FIELD OF THE INVENTION

This invention relates to an epoxy adhesive system. An aspect of this invention relates to a two-part epoxy adhesive composition in which part A comprises a curable liquid epoxide and part B comprises a bisamino piperazine containing thermoplastic polyamide hardener (sometimes referred to as the amine co-reactant or co-curative). Another aspect of the invention relates to a stable, one-part curable adhesive system which is formulated from a liquid epoxide and a bisamino piperazine containing thermoplastic polyamide. Still another aspect of this invention relates to a unique thermoplastic polyamide hardener composition for the two-part adhesive composition.

DESCRIPTION OF THE PRIOR ART

Two-component thermosettable epoxy adhesive compositions are well known as are curable liquid epoxides and polyamide curing agents. It is well known in the art that relatively high equivalent weight polyamides can be reacted with epoxy resins to form thermoset systems with good flexibility, impact resistance, T-peel strength and tensile shear strength. The reaction is, however, very sluggish. The sluggishness of the reaction can be overcome by using relatively lower equivalent weight polyamides since they possess high reactivity; however, when reacted with epoxy resins the resulting thermoset generally lacks the flexibility, impact resistance, T-peel strength, and tensile shear strength of a thermoset formed by using high equivalent weight polyamides.

The epoxy resin art is much broader than this particular field of adhesive systems, and it would be difficult to provide even a representative sampling of the whole field of epoxy technology. Needless to say, a wide variety of amine hardening agents have been used with an equally wide variety of curable epoxide monomers, prepolymers, etc. The following list of references is believed to be representative of the type of epoxy and polyamide technology relevant to the background of this invention.

| | |
|---|---|
| 2,379,413 | Bradley |
| 2,878,234 | Peterson |
| 2,881,194 | Peerman, et al |
| 2,999,826 | Peerman, et al |
| 3,002,941 | Peterson |
| 3,062,773 | Rogier |
| 3,377,303 | Peerman, et al |
| 3,565,837 | Drawert, et al |
| 3,717,598 | Rogier, et al |

Trade literature is also available from major suppliers of amine hardeners and epoxy resins. The compound 1,4-bis(3-aminopropyl) piperazine is available from Jefferson Chemical Co., Inc., which company publishes trade literature describing the compound and its properties.

SUMMARY OF THE INVENTION

It has now been found that when a suitable bisamino piperazine-containing thermoplastic polyamide is reacted with a suitable epoxide the resultant thermoset possesses the high-reactivity (quick set) of a hot-melt as well as the bonding strength and flexibilty normally associated with a thermoset. Thus the bisamino piperazine containing thermoplastic polyamide of this disclosure, when reacted with suitable epoxides, forms the high strength metal-to-metal bond usually associated with the use of high equivalent weight polyamides and possesses the high reactivity usually associated with the use of low molecular weight polyamides. While this invention is not bound by any theory, it is believed that the primary amines of the bisamine piperazine cause the production of a polyamide with sufficient amine termination so that it will react with a suitable epoxide to form a thermoset, while the tertiary amines act as a catalyst and help assure a fast initial reaction (quick reactivity characteristic).

Using the typical part A-part B terminology, a part A of this invention typically comprises a 100% solids polyglycidyl ether of a polyhydric phenol. The typical part B comprises a bisamino piperazine containing thermoplastic polyamide. It is preferred that part B also contain additional diamine components as described herein.

DETAILED DESCRIPTION

The basic theory of epoxide chemistry is reasonably well understood, although an exact theoretical explanation for the variety of actions which occur during curing is not always possible. In theory, the vicinal or 1,2-epoxide ring (also called the oxirane ring) can be opened by interaction with a compound having an available unbonded pair of electrons. Once the ring is opened, further reactions with active hydrogen bearing substituents can occur. When the electron pair-containing compound is an active hydrogen-bearing amine (i.e. a primary or secondary amine), both the electron pair on the nitrogen and the active hydrogen can participate in the reaction. There is no perfect term for describing the function of a primary or secondary amine in this context, it is variously referred to as a "hardener," a "co-curative," or "co-reactant" for the epoxide. In any event, the net result of the joining of the amine molecule and the epoxide-containing molecule is an increase in molecular weight and, typically, cross-linking between epoxide-containing molecules to yield a thermoset resin.

As is known in the art, tertiary amines are also very useful in epoxide chemistry. The unbonded electron pair on the tertiary nitrogen can also attack an epoxide ring and provide something similar to a true catalytic effect, since there are no active hydrogens available for cross-linking or polymerization reactions. Nonetheless, it can be useful to provide molar quantities of tertiary nitrogens, and (although this invention is not bound by any theory) it is believed to be significant that the polyamide hardener or co-curative of this invention contains a substantial mole-% (or equivalent-%) of tertiary nitrogen in combination with and in proximity to reactive terminal primary amine groups.

The terminology used to describe a component comprising a curable epoxide is also less than perfect. Sometimes this component is called an epoxy "resin." This may be a somewhat misleading way to refer to a monomer or prepolymer capable of being cross-linked or hardened or cured to a resinous solid, particularly since the "resin" may be a low molecular weight liquid. Accordingly, the curable liquid vicinal epoxide is referred to hereinafter as the "prepolymer," it being understood that the "prepolymer" can be in a very low stage of polymerization and need not contain any repeating units. Thus, a diglycidyl ether of Bisphenol A with an equivalent weight equal to exactly one-half the theoretical molecular weight for a molecule containing only one Bisphenol A moiety is intended to be included within the scope of the term "prepolymer."

THE EPOXIDE (PART A) COMPONENT

From the standpoint of effectiveness and commercial availability, an epoxide component typically preferred for use in this invention comprises a polyglycidyl ether of a polyhydric phenol. In the case of low molecular weight polyhydric phenols such as resorcinol, polyglycidyl ethers with an equivalent weight as low as about 100 are theoretically obtainable. With higher molecular weight polyhydric phenols such as Bisphenol A, epoxide equivalent weights (EEW's) of at least about 180 or 190 are more common. Many of the commercially available diglycidyl ethers of Bisphenol A have an EEW well in excess of 200, since the epoxy prepolymer can contain at least 2, sometimes at least 5, or even as many as about 10 repeating Bisphenol A moieties. See, for example, the structural formula in columns 1 and 2 of U.S. Pat. No. 2,878,234 (Peterson), issued Mar. 17, 1959, wherein it is pointed out that the repeating Bisphenol A-containing moiety enclosed within the parentheses can recur as many as 10 times.

As is known in the art, many other types of epoxy resins are commercially available, including the so-called aromatic and cycloaliphatic epoxides. (The polyglycidyl ethers of polyhydric phenols are considered "aliphatic" epoxides.) Some of the available epoxide prepolymers can include epoxide rings of differing reactivity (e.g. one aliphatic and one cycloaliphatic), as in the case of vinyl cyclohexane dioxide. Epoxide prepolymers used in this invention should have an epoxide equivalent weight (EEW) greater than 60 and preferably greater than 150. Both solid and liquid prepolymers can be used, but liquid prepolymers are preferred. At the present time, there appears to be no advantage in using epoxy prepolymers with an equivalent weight greater than about 2,000, and the ordinarily preferred EEW range for most commercial uses of this invention need not exceed about 1,000.

The polyglycidyl ethers of polyhydric phenols, the preferred type of epoxide prepolymer, are readily available from several suppliers, including Shell Oil Company (under the "EPON" series of trademarks) and Dow Chemical Company (under some of the "DER" trademarks). The purity of the "resin" (i.e. prepolymer) or other factors which can vary according to the source or supplier do not appear to be significant in this invention. It is preferred that the epoxide component be an essentially 100% solids material (i.e. be substantially free of solvent), although any desired amount of solvent can be used.

For "solids" levels (ASTM D 1489) of, for example, 10-90% by weight, organic liquids conventionally used either to reduce the viscosity of liquid epoxides or to dissolve solid prepolymers can be used in this invention. Examples of such solvents include $C_1$ to $C_6$ chlorinated hydrocarbons, ketones, aromatics, liquid amides, and the like. The selection of the solvent for the Part A (epoxy) component depends generally upon the desired type of reaction medium for the Part A/Part B curing reaction and upon the characteristics of the solvent and/or solids materials of Part B.

Several different Part A/Part B (oxirane/amine-terminated polyamide) media can be selected, e.g. a one-phase (or two-phase) molten system, a heterogeneous liquid system (e.g. a dispersed phase system or an interfacial system), a homogeneous system (e.g. a blend of compatible Part A and Part B systems, which can contain substantial amounts of generally compatible solvents), or the like. Liquid-free, room temperature systems (e.g. a blend of powdered solid epoxy and powdered polyamide) have latent characteristics; that is, they do not provide a medium for the oxirane/amine reaction at normal ambient temperatures. On the other hand, at temperatures above the softening point of the polyamide, the reaction can be rapid in a variety of reaction media. If a homogeneous organic liquid reaction medium is desired, any Part A is preferably selected for compatibility with Part B solvents such as aromatics or nitrated aliphatics or $C_2$-$C_6$ alcohols (including polyhydric alcohols) or $C_1$-$C_6$ ethers of polyhydric alcohols.

THE ACTIVE HYDROGEN (PART B) COMPONENT

The epoxides used in the adhesive systems of this invention are cured or hardened or co-reacted with an active hydrogen component comprising a polyamide made from active hydrogen-containing components such as polyamines and polycarboxylic acids. As is known in the art, primary and secondary amino groups and carboxylic acid groups (—COOH) can react under condensation reaction conditions and with removal of by-products to form amide linkages, i.e. —N(R)—CO—, where R is H or an organic group. (Although less commonly used in industrial practice, there are various known functional equivalents of carboxylic acid starting materials, e.g. carboxylic acid halides, esters, anhydrides, etc.) If the carboxylic acid and amine groups tend to form ammonium salts, the condensation reaction can nevertheless be favored if the reaction conditions sufficiently provide for removal of water or other by-products of the condensation.

The polyamines used to make the polyamide are preferably diamines, since difunctionality is extremely well suited to the synthesis of a polyamide co-curative or hardener which satisfies the molecular weight and equivalent weight requirements of the active-hydrogen component. Two or more types of diamines can ordinarily be used in combination in the polyamine reactant which combines with the polycarboxylic acid reactant (or equivalent thereof, e.g. acid halide, acid anhydride, etc.) to form the aforementioned polyamide.

The most important and essential type of diamine is a 1,4-bis- primary amino lower alkyl piperazine, e.g. a compound of the formula

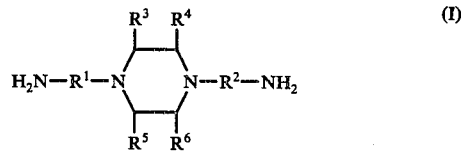

(I)

wherein $R^1$ and $R^2$ are lower alkylene (e.g. $C_2$-$C_6$ alkylene such as propylene, a commonly-available species being 1,3-propylene); although $R^1$ and $R^2$ can be different, symmetrical molecules are preferred, in which case $R^1$ and $R^2$ will be the same (e.g. 1,3-propylene); and wherein $R^3$ through $R^6$ are the same or different and are hydrogen or other relatively inert substitutents such as alkyl groups.

When $R^1$ and $R^2$ are 1,3-propylene and $R^3$ through $R^6$ are hydrogen, the compound of Formula (I) is 1,4-bis (3-aminopropyl) piperazine, i.e.

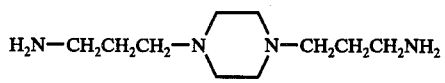
(II)

Compound (II) has a molecular weight of 200.34 and is commercially available from Jefferson Chemical Co., Inc. of Houston, Texas. According to Jefferson Chemical Co. data sheets, Compound (II) has an equivalent weight (by titration) of 66.9. The theoretical equivalent weight of Compound (II) or Compound (I) depends upon how the amine functionality is defined. The primary amine functionality is theoretically 2, but two tertiary nitrogens are also present - an important facet of these di-primaryamine molecules. The terminal primary amines are believed to provide four highly available, sterically unhindered active hydrogen atoms, while the tertiary amine groups are believed to provide the benefits of high reactivity and low equivalent weight. That is, a high molecular weight polyamide containing a significant amount of Compound (I) or Compound (II) appears to behave, in terms of reactivity, like a low equivalent weight co-curative or hardener.

As is known in the art, each primary amino (—NH$_2$) group can provide a branching point for the formation of a thermoset resin by reaction with epoxides. This thermosettable characteristic of the polyamide co-curative or hardener can be important to the bond strength of the ultimately obtained thermoset adhesive system. However, a good bond and a good adhesive system for providing the bond should meet a variety of other requirements (e.g. relatively low brittleness) which are normally satisfied by greater physical flexibility and/or a reduction in the glass transition temperature of the cured system. A variety of epoxide "flexibilizers" are known, among them materials which include oxyalkylene chains of the formula —AO—$_n$, wherein A is lower alkylene (e.g. ethylene, 1,2- or 1,3-propylene, and 1,2- or 1,4-butylene) and $n$ is the index of polymerization; typically, $n$ is selected to provide an oxyalkylene chain with a molecular weight ranging from as low as about 100 up to about 10,000, a range of 300–5,000 being more common.

Unfortunately, "flexibilized" epoxy adhesive bonds may lack shear strength and heat resistance. In this invention, the Compound (I) ingredient, properly combined with other polyamines and/or dicarboxylic acids in the polyamide, helps to avoid excessive brittleness, low shear, and low heat resistance. Other suitable polyamines for combination with the Compound (I) ingredient can be primary and/or secondary amines, including molecules with both primary amine and secondary amine functional groups. These polyamines can, if desired, comprise "flexibilizer" ingredients with polyoxyalkylene or polyester flexibilizing chains; however, a flexibilizing chain is not a firm requirement for polyamides of this invention, so long as the polyamide meets the following requirements:

(a) it should have available (preferably terminal), highly reactive primary amine groups for chain branching or cross-linking reactions during the curing or hardening of the epoxide;
(b) it should preferably have the characteristics of a hot melt, i.e at least some thermoplasticity and at least some inherent tack in the molten state, without admixture with solvents or a tackifier resin (thermoset polyamide resin hardeners are within the scope of this invention but are not preferred);
(c) it should have sufficiently high viscosity and molecular weight without sacrifice of the reactivity of the primary amine groups toward the epoxide rings.

In making polyamides according to this invention, the proportions and conditions are manipulated to favor at least some termination with moieties comprising Compound (I) linked by an amide group to a chain or other main body of the polyamide molecule. Thus, with end groups based on Compound (I), a primary amino (—NH$_2$) group is not only available, it is also linked through a short alkylene chain (less than seven carbons long, preferably less than four carbons long) to a tertiary nitrogen which greatly increases the reactivity of this —NH$_2$ group. However, the presence of tertiary amines in the end groups need not reduce either the hot melt-type properties or the flexibilizing properties of the polyamide.

The aforementioned suitable polyamines, one or more of which can be used in addition to Compound (I) diamines are typically diamines also and can be aliphatic, cycloaliphatic, or aromatic diamines containing 2 to 36 carbon atoms, including heterocyclic aromatic and heterocycloaliphatic diamines. As noted previously, hetero atoms can be included in the aliphatic chain moiety of the aliphatic diamines, particularly when "flexibilizing" chains of the polyester type (i.e. poly[aliphatic dicarboxylic/aliphatic diol] polyesters and, less commonly, polymerized lactones) or the polyoxyalkylene type. In recent years, poly(oxyalkylene)-diamines have become commercially available, particularly the primary amine terminated types, which are normally preferred in any event.

Of the simpler aliphatic amines, alkylene amines are readily available both as straight-chain diamines (ethylene diamine; 1,3-diaminopropane; 1,4-diaminobutane, etc.) and branched-chain diamines (e.g. trimethyl hexamethylene diamine). Aralkyl amines such as xylylene diamine or bis(aminomethyl) benzene and cycloaliphatic-aliphatic amines (e.g. cyclohexyl bis[methyl amine]) have been used in this art and are included within the term "aliphatic amine." In the petrochemical industry, there are many uses for aromatic diamines (phenylene diamine, tolylene diamine, etc.); accordingly, these materials can be easily obtained. Though somewhat less common, the cycloaliphatic diamines such as isophoronediamine have similar uses and thus are almost as readily available.

Besides the oxyalkylene-containing diamines, other ether diamines can be prepared, for example, by cyanoethylation of diols with subsequent reduction, e.g. 1,12-diamino-4-dioxadodecane.

Secondary amines can be utilized in making polyamides of this invention, although termination of the polyamide with secondary amino substituents is preferably avoided; that is, it is preferred that the secondary amines be "buried" in the polyamide structure. Among the suitable secondary amines are heterocyclic amines such as piperazines (piperazine itself; N-aminoalkyl piperazines such as N-aminoethyl piperazine, etc.) and 1,2-dimethyl-2-aminopropyl piperadine.

For a variety of reasons, it is preferred that any primary or secondary polyamine used in the synthesis of polyamides of this invention have reasonably reactive amino groups. As noted previously, primary amino end groups are preferably selected with a view toward high reactivity toward epoxides. Secondary amines or amines "buried" within the polyamide structure should have a reactivity with carboxylic acids or their equivalents which is sufficient to insure an effective and convenient polyamide synthesis. Thus, compounds having only amino groups with low reactivity due to steric hindrance, delocalization of unbonded electron pairs into aromatic rings (especially nitrated aromatic rings), and other electron-withdrawing or undesirable inductive effects are preferably avoided.

In short, a key ingredient of the polyamine material used to make the polyamide is the 1,4-bis-aminoalkyl piperazine, and the other primary and/or secondary amines discussed previously generally serve as chain extenders, flexibilizers, etc. for the resulting polyamide. Ideally, at least 90% of the terminal groups on the polyamide would be the residue of the 1,4-bis-aminoalkyl piperazine, and at least 20 mole % of such terminal groups can be readily achieved in practice. (By "residue" is meant the compound of Formula (I) with at least one hydrogen of an $NH_2$ group removed and replaced by a valence bond; similarly, the term "residue" applied to the carboxylic acid or functional equivalent thereof denotes a —CO—R—CO—moiety, wherein R is any of the aliphatic, cycloaliphatic, aromatic, etc. groups described previously.)

The polycarboxylic acid material (or functional equivalent thereof) combined with the polyamine material to form the polyamide is preferably a dicarboxylic acid (or functional equivalent thereof) derived from polymerization of unsaturated higher fatty acids (i.e. solid fatty acids typically above $C_{12}$, e.g. $C_{12}$–$C_{24}$ in chain length and containing at least one carbon-carbon double bond). However, other dicarboxylic acids can be used in lieu of or in addition to the polymerized unsaturated fatty acids. Because of its toxicity and short chain length, oxalic acid is ordinarily not preferred for use as the dicarboxylic acid, particularly as compared to higher saturated aliphatic dicarboxylic acids (malonic, succinic, etc., particularly good results having been obtained with azelaic acid). Aromatic and cycloaliphatic dicarboxylic acids are also known and can enter into amidification reactions, either as such or as their functional equivalents (acid halides, anhydrides, etc.). Because of their use in the manufacture of polyesters, the terephthalic acids and similar aromatic dicarboxylic acids are readily available. Cycloaliphatic diacids or the corresponding anhydrides have also been used in polyester manufacture and are thus commercially available; among these are the cycloaliphatic dicarboxylic acids or acid anhydrides obtained through the hydrogenation of their aromatic precursors (e.g. hydrogenated terephthalic or phthalic acids and endomethylene analogs thereof).

It has long been known that the dimeric fatty acids can be condensed with diamines to yield polyamide resins useful in epoxy technology. These dimeric acids are typically obtained by polymerizing unsaturated higher fatty acids. Consistently high yields of the dimer can be obtained (e.g. more than 65% dimer, the balance typically being the trimer and a relatively insignificant amount of monobasic acid, e.g. less than 5% by weight. For optimum results, the dimer acid should have a molecular weight in excess of 250 (an equivalent weight in excess of 125), e.g. 400 or more (an equivalent weight of 200 or more). Accordingly, the molecular weight of the trimer acids is normally at least 375, preferably at least 600. Suitable monofunctional higher unsaturated fatty acids from which the dimer or trimer acids can be synthesized are obtained from naturally occurring triglycerides or the like, e.g. the common drying oils. Commercially available examples of polymerized unsaturated fatty acids (which are predominantly dimeric) include the "EMPOL" polybasic acids (trademark of Emery Industries, Inc.). These commercially available materials can be of sufficient purity to be considered to be functionally equivalent to high molecular weight aliphatic dicarboxylic acids. Accordingly, where lower molecular weight dicarboxylic acids are suitable, e.g. azelaic acid, these higher molecular weight diacids need not be used; however, it is generally preferred to include at least some of the higher molecular weight diacids in the polycarboxylic acid starting materials for the polyamide. Depending upon the chain length, chain flexibility, amount of paraffinic character, etc. desired in the polyamide, any of the aforementioned polycarboxylic acids can be used alone or in combination with other polycarboxylic acids to make the polyamide.

As noted previously, amidification can be achieved by direct combination of the polycarboxylic acid and polyamine starting materials. Regardless of whether or not an ammonium salt intermediate is formed, this direct amidification procedure is favored when condensation products such as water are removed from the reaction zone, e.g. through a combination of applied heat and vacuum. The preferred polycarboxylic acids and polyamines used to make polyamides of this invention have sufficient thermal stability (and the resulting polyamides have sufficient thermal stability) to make this synthetic procedure practical. If for any reason a thermally sensitive material is used in any step of the amidification process, relatively low temperature synthesis procedures can be used, e.g. those procedures involving the use of dicarboxylic acid halides.

The preferred direct amidification synthesis (condensation of the diacid and diamine) is typically carried out at temperatures from about 180° C. to 300° C., and the use of vacuum or reduced pressure (e.g. 0.5–50 mm of Hg) is particularly helpful during the last condensation stages for the removal of relatively volatile byproducts of the condensation such as water or alcohol. A typical heating schedule is as follows: heating to 240° C. over about two hours and maintaining the temperature at about 240° C. for about two hours at atmospheric pressure under a nitrogen blanket, followed by about one-two hours under vacuum, also at 240° C.

The resulting polyamides are preferably thermoplastic and exhibit some or substantially all of the properties of a hot melt composition. Accordingly, these thermoplastic polyamides are useful per se in the same manner as many other types of conventional polyamides. They are useful per se (i.e. in the absence of epoxides) as hot melt adhesives. However, several of the most important advantages of these polyamides peculiarly relate to the field of epoxide chemistry.

In some respects, the hot melt-like behavior of these polyamides and their use in epoxide chemistry are related. At least some bonding can be obtained with the polyamide hot melt behavior by itself, even before reactions with the epoxide component have progressed beyond the initial stages of cure. Accordingly, one can take advantage of the bond provided by the hot melt behavior, e.g. by forming an article with sufficient integrity to be put to use, stored, or further processed while the epoxy curing reactions are progressing. By contrast, it is necessary with some prior art epoxy resin systems to mechanically hold the article together until the cure at the adhesive joints or bonds has provided enough structural integrity to remove the mechanical supports, clamps, etc.

The total molecular weight of polyamides obtained according to this invention is similar to known polyamides, e.g. those disclosed in U.S. Pat. No. 3,377,303 (Peerman et al), issued Apr. 9, 1968 and U.S. Pat. No. 3,565,837 (Drawert et al), issued Feb. 23, 1971. Melting points and/or softening points of polyamides of this invention are preferably in the same range as conventional hot melt adhesives, i.e above 150° F. and below about 500° F., e.g. 160°–350° F. The 200°–300° F. range is particularly preferred. Expressed in terms of the Centigrade or Celsius scale, the typical melting point range for hot melts is 65°–200° C.

The polyamides are generally amine-terminated and have amine numbers in the range of 20–150, e.g. 50–60, including the tertiary amino groups in the structure. Amine equivalent weights typically range from 500 to 1,000, but higher equivalent weights can be obtained through the use of appropriate chain extension reactions and/or high molecular weight diamines such as the polyoxyethylene or polyoxypropylene diamines with more than 10 or 20 repeating oxyalkylene units. Polyoxypropylene diamines with equivalent weights in the range of 115–1,000 are commercially available.

To obtain the most advantageous "hot melt" effect, melt viscosities of the polyamides are preferably in the range of 500 to 60,000 centipoise. For example, a particularly useful range of viscosity is 9,000–30,000 cps, determined at 200° or 210° C. for a polyamide with a ball and ring softening point within the range of 120°–150° C.

As will be apparent from the discussion of amine equivalent weights and amine numbers, the amine starting materials are preferably used in excess to avoid carboxylic acid termination of the polyamide. That is, the NRH/COOH ratio exceeds 1:1 and can even exceed 2:1. (The expression NRH refers to primary and/or secondary amines, wherein R is H or an organic group). An NRH/COOH ratio in excess of 1.5:1 may unduly inhibit chain extension reactions and/or result in a product containing excessive amounts of unreacted polyamine; hence the NRH/COOH is typically below this level. By weight, the polybasic acid component (or its functional equivalents) normally exceeds the polyamine component. A typical starting material mixture comprises 25–35% by weight of the polyamine component and 65–75% by weight of the polycarboxylic acid component. Reaction conditions and/or order of addition of reactants can be manipulated to insure that the 1,4-bis alkylamino piperazine compound or compounds will react last, and that most of the chain extension will be brought about by other amines which can be "buried" in the polymer structure. The use of reactive short-chain aliphatic diamines such as ethylene diamine or, more preferably, secondary diamines such as piperazine are effective in providing chain extension without substantially reducing the possibility of terminating the polyamide with the aforementioned bisamino piperazine compounds.

While the presence of almost any amount of 1,4-bis alkylamino piperazine will contribute an improvement in reactivity of the resulting polyamide as well as in the bond strength properties of the epoxy resin system, it is preferred that this bis alkylamino piperazine component provide from about 20 to 90 equivalent percent of the total amine groups of the polyamine component used to make the polyamide. A range of 25 to 75 equivalent percent of the aforementioned bisamino piperazine component is preferred, and optimum properties for epoxy resin systems are obtained with the use of about 45 to 65 equivalent percent. Polyamides prepared using 50 equivalent amine percent of this bisamino piperazine component, when used to cure suitable epoxides, show outstanding adhesive properties as evidenced by their resistance to peeling, for which values as high as 50 pounds per inch are reached, accompanied by high tensile shear strength.

It is preferred that the dicarboxylic acid component comprise 70–100 equivalent percent of the substantially dimerized unsaturated fatty acid and 0–30 equivalent percent of relatively lower molecular weight straight chain aliphatic dicarboxylic acids such as malonic, adipic, succinic, sebacic, pimelic, and azelaic. As noted previously, the commercially available dimerized unsaturated fatty acids (e.g. dimerized oleic acid) contain relatively small amounts of trimer acid and virtually negligible amounts of unreacted monocarboxylic acid. For example, "EMPOL" 1014 (trademark of Emery Industries, Inc.) contains about 95% dimer acid and can be considered to be functionally equivalent to a $C_{36}$ straight chain saturated aliphatic dicarboxylic acid. Thus, except for any cycloaliphatic or aromatic acids which may be employed, the dicarboxylic acid component of the polyamide can be considered to be more than 90 equivalent percent $C_3$–$C_{48}$ aliphatic dicarboxylic acid.

A particularly preferred polyamide of this invention comprises the condensation product of a reaction mixture containing 25–35% by weight of a diamine component comprising (1) 45–65 equivalent-% of the 1,4-bisalkylamino piperazine; (2) 15–35 equivalent-% of polyoxyalkylene diamine containing about 2 to about 35 repeating oxyalkylene units; an (3) from about 15 to 35 equivalent-% (e.g. 20–30 equivalent-%) of a diamine chain extender such as an alkylene diamine or a di-secondary amine such as piperazine. The polyfunctional carboxylic acid component typically makes up 65 to 75% by weight of the reaction mixture and comprises 70–100 equivalent-% polymerized drying oil fatty acid having a dimer content of at least 65% by weight (e.g. 90% or more) and 0–30 equivalent-% of a $C_3$ – $C_{10}$ aliphatic dicarboxylic acid, e.g. a straight chain, saturated di-oic acid such as azelaic acid.

OTHER INGREDIENTS

The amides of this invention can have a significant plasticizing effect; accordingly, it is ordinarily unnecessary to add the usual ester-type plasticizers. However, where exceptionally high levels of plasticizing are useful, these ester-type compounds or their equivalents can be added to one or both parts of the two-part system. Pigments, fillers, reinforcers, nonreactive diluents (e.g. organic liquid solvents) can also be included in either or both of the two parts.

PART A/PART B RATIOS

The ratios of the epoxide component to the polyamide component are similar to those commonly used in this art and can range from 0.5:1 to 10:1 by weight. Ordinarily, an excess of Part B is preferred, e.g. at least 1.5:1. (These ratios assume 100% "solids" Part A and Part B components.)

The manner of applying the two-part system to an adhesive joint is well known in the art and typically involves pre-mixing the components prior to application, since the resulting reaction mixture has a very adequate pot life, ranging from hours to days, depending upon the ambient temperature.

The principle and practice of the present invention is illustrated in the non-limiting Examples, wherein amounts are given and percentages are by weight unless otherwise indicated.

EXAMPLE 1

Five hundred parts by weight (57.2%) of polymeric tall oil fatty acid containing 96 percent of dimeric fatty acids ("EMPOL" 1014 from Emery Industries, Inc.) was heated to 60° C. under nitrogen with 125 grams (14.3%) of azelaic acid. Fifty parts by weight (5.7%) of polyoxypropylene amine ("JEFFAMINE" D-400, trademark of Jefferson Chemical Company, Inc., approximate molecular weight = 400), 155 parts by weight (17.7%) of 1,4-bisaminopropyl piperazine and 44 parts by weight (5.0%) of ethylenediamine were added and the temperature was raised to 235° C. over two hours. The temperature was then held for 3 hours at 235° C. During the last two hours a vacuum of 25 mm/Hg was applied for improved removal of the water of reaction. The polyamide resins obtained had a ball and ring softening point of 125° C. and a total amine number was 70. This polyamide, when reacted with diglycidyl ether-Bisphenol A epoxy resin ("EPON" 828, trademark of Shell Chemical) gave tensile shear strength for aluminum to aluminum of 3000 psi and T-peel of 35 pounds/inch.

EXAMPLE 2

Five hundred parts of "EMPOL" 1014 (trademark; see Example 1) with 120 parts of azelaic acid were heated to 60° C. Sixty parts of "JEFFAMINE" D-400 (trademark; see Example 1), 93 parts of bispiperazine of Example 1, 25 parts of piperazine and 44 parts of ethylenediamine were used. The same procedure that was used in Example 1 was used to make the polyamide. The resulting polyamide had a ball and ring softening point of 127° C., the total amine number was 45 and the viscosity was 9000 cps at 400° F.

What is claimed is:

1. A polyamide composition comprising the amidification product of a dicarboxylic acid component, or functional equivalent thereof, and a diamine component; said polyamide being the amidification of the components comprising:
    (a) from about 25–35% by weight of a diamine component comprising:
        (1) from about 45–65 equivalent percent of 1,4-bis lower alkylamino piperazine;
        (2) from about 15–35 equivalent percent polyoxypropylene diamine having a molecular weight of about 100 to about 10,000;
        (3) from about 15–35 equivalent percent of a diamine chain extender selected from the group consisting of alkylene diamine and piperazine;
    (b) from about 65–75% by weight of a dicarboxylic acid component comprising:
        (1) from about 70–100 eqivalent percent polymerized drying oil fatty acid having a dimeric fatty acid content greater than 90% by weight;
        (2) from about 0–30 equivalent percent azelaic acid.

2. A polyamide composition according to claim 1 wherein:
    said 1,4-bis lower alkylamino piperazine is 1,4-bis(3-aminopropyl) piperazine;
    said diamine chain extender is piperazine.

3. A two-part thermosettable epoxy adhesive system comprising a curable epoxy resin and a polyamide curing agent therefor, said system comprising:
    in a first part, a liquid curable epoxy resin having an epoxide equivalent weight greater than 60, said curable epoxy resin being capable of being cured with a solid polyamide curing agent when said solid polyamide curing agent is heated to a temperature above its softening point; and
    in a second part, a polyamide curing agent for said curable epoxy resin, said polyamide being solid at room temperature and having a softening point above 65° C., said polyamide containing at least 20 mole % terminal groups which are residues of 1,4-bisalkylamino piperazine, said polyamide comprising the residue of a polycarboxylic acid or functional equivalent thereof, linked by amido linkages to the residue of an amine having a plurality of amine groups; said residue of said amine having been derived from a polyamine comprising 20–90 amine equivalent percent of said 1,4-bisalkylamino piperazine; said residue of said polycarboxylic acid comprising the residue of an aliphatic dicarboxylic acid selected from the group consisting of: a dimerized unsaturated fatty acid; a straight-chain, saturated aliphatic dicarboxylic acid; and mixtures thereof.

4. An adhesive system according to claim 3 wherein, in said second part, said polyamide is the reaction product of the components comprising:
    (a) a polycarboxylic acid having a plurality of carboxylic acid groups or functional equivalents thereof,
    (b) excess over stoichiometry, with respect to said polycarboxylic acid, of a diamine component, said diamine component comprising:
        (1) 20–90 equivalent percent of a 1,4-bisalkylamino piperazine of the formula:

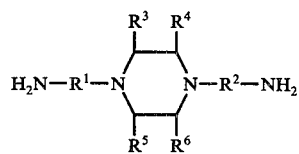

wherein $R^1$ and $R^2$ are $C_2$-$C_6$ alkylene; and $R^3$, $R^4$, $R^5$, and $R^6$ are hydrogen or alkyl;
        (2) 10–80 equivalent percent of a diamine selected from the group consisting of alkylene diamine, poly(oxyalkylene) diamine, a di-secondary amine, and mixtures thereof.

5. An adhesive system according to claim 4, wherein, in said second part, said polycarboxylic acid consists essentially of the dimer and trimer of a drying oil fatty acid.

6. An adhesive system according to claim 5 wherein said polycarboxylic acid consists essentially of at least 65% by weight of said dimer, the balance of said polycarboxylic acid consisting essentially of said trimer and a straight-chain saturated aliphatic dicarboxylic acid.

7. An adhesive system according to claim 4 wherein said diamine component comprises 45–65 equivalent percent of said 1,4-bisalkylamino piperazine.

8. An adhesive system according to claim 4 wherein the diamine component (2) comprises (a) 15–25 equivalent percent of a polyoxyalkylene diamine having a molecular weight ranging from about 100 to about 10,000 and (b) 20–30 equivalent percent of an alkylene diamine or di-secondary amine diamine.

9. An adhesive system according to claim 4 wherein $R^3$, $R^4$, $R^5$, and $R^6$ of the bisamino piperazine compound of said diamine component are hydrogen.

10. An adhesive system according to claim 4 wherein the bisamino piperazine compound of said diamine component is 1,4-bis(3-aminopropyl) piperazine.

11. An adhesive system according to claim 3 wherein the said residue of a polycarboxylic acid comprises the residue of a polymerized unsaturated higher fatty acid mixture containing at least 90% by weight of dimeric fatty acid and azelaic acid.

12. An adhesive system according to claim 8 wherein the polyoxyalkylene diamine is a polyoxypropylene di-primary amine; wherein the alkylene diamine is ethylene diamine, and wherein the di-secondary amine is piperazine.

13. An adhesive system according to claim 3 wherein the epoxide prepolymer is a polyglycidyl ether of a polyhydric phenol.

14. An adhesive system as defined in claim 12 wherein the curable epoxy resin is the reaction product of epichlorohydrin and Bisphenol A.

15. A cured composition comprising the adhesive system of claim 3, the two parts of which have been mixed together and co-reacted.

16. A cured epoxy adhesive composition comprising the adhesive system of claim 14, the two parts of which have been mixed together and co-reacted.

17. A mixture with a pot life of more than one hour at normal ambient temperatures comprising the two parts of an adhesive system as defined in claim 3 wherein the two parts have been mixed together.

18. A mixture with a pot life of more than one hour at normal ambient temperatures comprising the two parts of an adhesive system as defined in claim 14 wherein the two parts have been mixed together.

* * * * *